United States Patent [19]

McArthur et al.

[11] Patent Number: 4,792,255

[45] Date of Patent: Dec. 20, 1988

[54] COUPLING ASSEMBLY

[75] Inventors: James McArthur, Coquitlam; Steven E. Hodge, Burnaby, both of Canada

[73] Assignee: Med-Ex Diagnostics of Canada Inc., Coquitlam, Canada

[21] Appl. No.: 102,452

[22] Filed: Sep. 29, 1987

[51] Int. Cl.⁴ .............................................. B25G 3/18
[52] U.S. Cl. .................................. 403/325; 403/328; 403/322
[58] Field of Search ............... 403/328, 325, 327, 322; 411/348

[56] References Cited

U.S. PATENT DOCUMENTS 2,579,382 12/1951 Gattiker, Jr. et al. ............... 403/328
3,073,192 1/1963 Beers ................................. 403/328 X
3,172,675 3/1965 Gonzalez ......................... 403/325 X
3,208,318 4/1965 Roberts ........................... 403/325 X Primary Examiner—Andrew V. Kundrat
Attorney, Agent, or Firm—Townsend and Townsend

[57] ABSTRACT

An improved coupling assembly between an actuating member and a shaft is disclosed. It is comprised of locking means on the actuating member for engaging with the shaft in order to secure the actuating member thereto. In addition, an actuating means for actuating the locking means to allow removal of the actuating member is provided. Groove and key means between the actuating member and the shaft is provided to allow the member to be removed longitudinally thereof while preventing rotation of the member about the shaft when the locking means is engaged with the shaft.

3 Claims, 2 Drawing Sheets

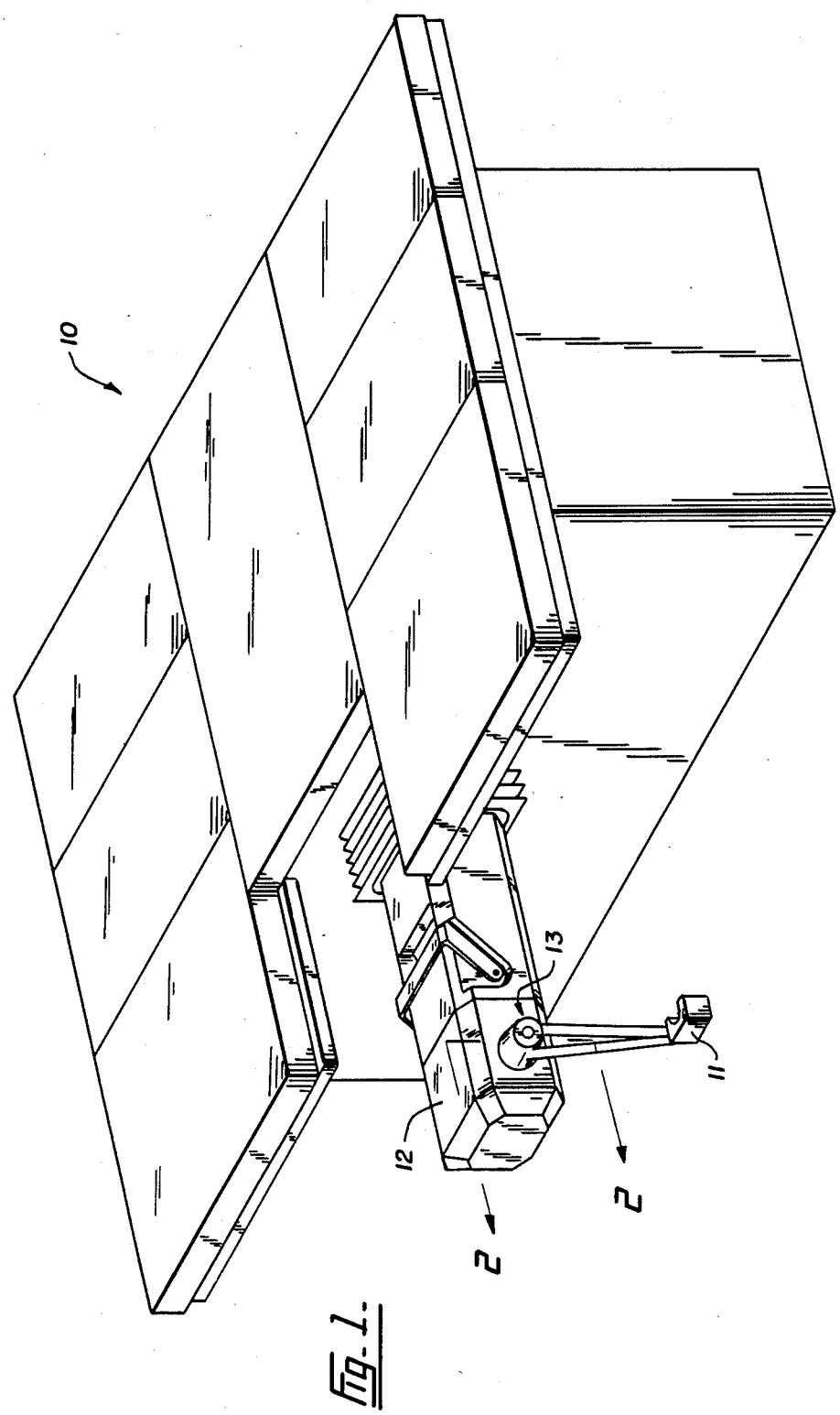

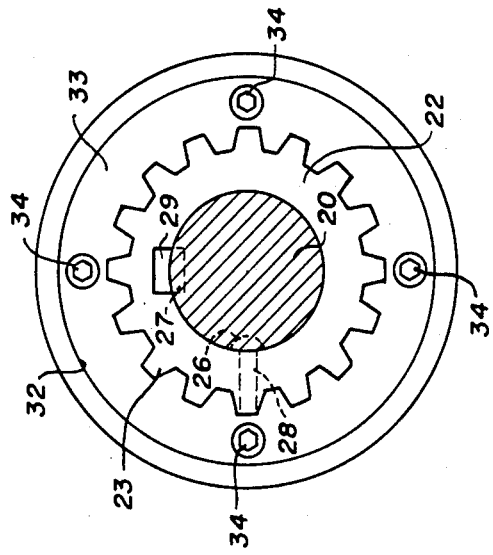
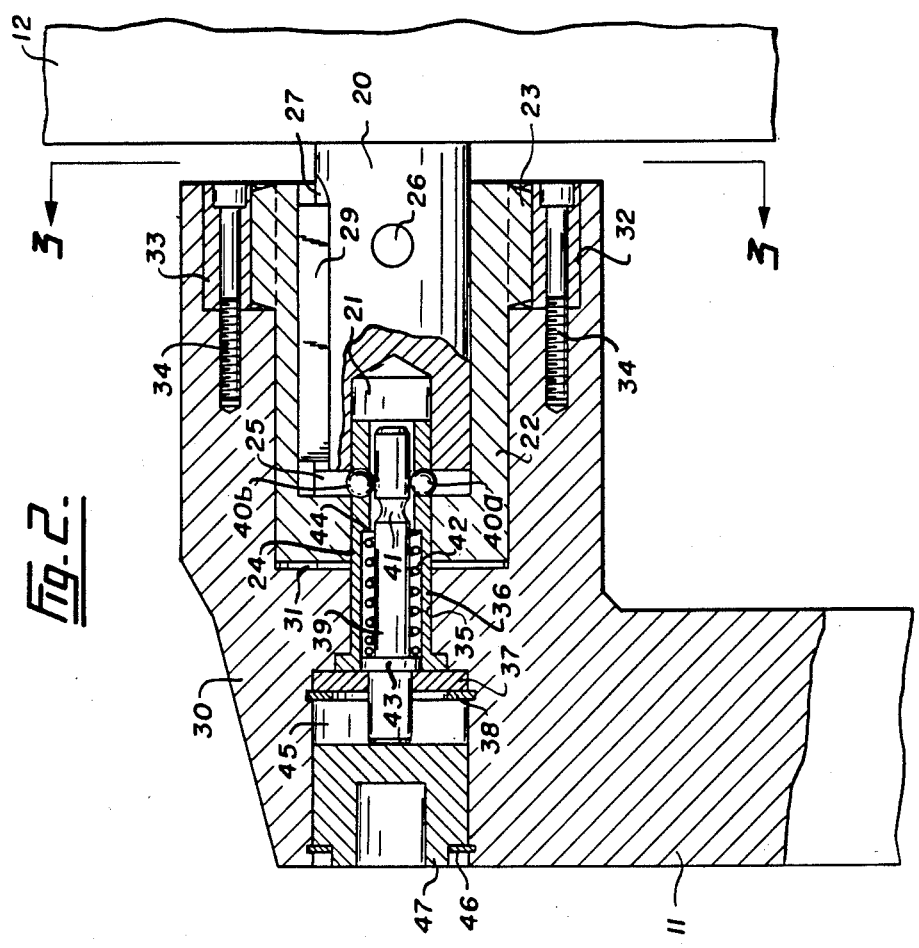

COUPLING ASSEMBLY

FIELD OF THE INVENTION

This invention relates to coupling assemblies but more particularly to an adjustable coupling assembly which allows an exercising member to be locked and secured in a multitude of positions about a shaft while still permitting the removal of the exercising member.

DESCRIPTION OF THE PRIOR ART

U.S. Pat. No. 4,637,607 which issued to the applicant discloses a drive unit for an exercising apparatus for providing a friction resistance based on applied force. In this system, rotational motion is translated from a gear housing to an exercising member by means of a transverse shaft. The exercising member although removably rigidly coupled to this shaft, cannot be readily removed and exchanged with other types of exercising members without the use of a special tool.

For example, the above-referenced drive unit is used in the testing, training, rehabilitating and researching all the major muscle groups, including: wrists, elbow, shoulder, back, abdominal, hip, knee, and ankle. To achieve this full range of testing, various exercising members have to be readily and quickly interchangeable.

There is accordingly a requirement for an improved coupling assembly for use between an exercising member and a driven shaft which can provide a wide range of positions and which can be fixedly secured to a driven shaft, and which can allow the removal of the exercising member without the need for any tools.

SUMMARY OF THE INVENTION

It is therefore an object of the present invention to provide an improved coupling assembly between an actuating member and a shaft.

Another object of the present invention is to provide an improved coupling assembly in which the actuating member can be fixedly fitted over a shaft in a multitude of angled positions with respect to the shaft.

Yet a another object of the present invention is to provide an improved coupling assembly which allow the actuating member to be removed from the shaft without the use of any tools.

Accordingly, an aspect of the present invention is to provide an improved coupling assembly between an actuating member and a shaft, comprising: locking means on said member for engaging with said shaft to secure said member thereto; actuating means for activating said locking means to allow removal of said actuating member from said shaft; and groove and key means between said actuating member and said shaft to allow said member to be removed longitudinally thereof while preventing rotation of said member about said shaft when said locking means is engaged with said shaft.

DESCRIPTION OF THE DRAWINGS

Particularly embodiments of the invention will be understood in conjunction with the accompanied drawings in which:

FIG. 1 is a perspective view of the exercising apparatus on which can be installed the improved coupling assembly of the present invention; and FIG. 2 is a sectional view taken along the lines 2—2 of FIG. 1 showing the improved coupling assembly of the present invention.

FIG. 3 is a view taken along line 3—3 of FIG. 2.

DESCRIPTION OF THE PREFERRED EMBODIMENTS

Referring now to FIG. 1, we have shown generally at reference numeral 10 the exercising apparatus disclosed in U.S. Pat. No. 4,637,607. The exercising apparatus encloses various motors and driving elements adapted to provided kinetic friction which has to be overcome by the user by means of an actuating member 11. Actuating member 11 is attached to a shaft not shown connected to a gear housing 12. The improved coupling assembly between actuating member 11 and a shaft is shown generally at reference numeral 13.

Referring now to FIG. 2, we have shown, a sectional view of the improved coupling assembly of the present invention. The shaft connecting actuating member 11 through to the gear housing 12 is comprised of a hub 20 having a central aperture 21 thereof. A sleeve 22 covers hub 20 and includes a spline collar 23 at the sleeve end nearest gear housing 12. As best shown in FIG. 3, sleeve 22 is rigidly secured to hub 20 by means of screw 28 extending through spline collar 23 to engage in depression 26 in hub 20. In addition, keyway 27 is provided in hub 20 and projecting key 29 engages sleeve 22 to ensure that the sleeve does not rotate on hub 20. At the end opposite spline collar 23, sleeve 22 is provided with a central aperture 24 adapted to be aligned with central aperture 21 of hub 20.

Sleeve 22 is longer than hub 20 and as a result, an internal radial groove 25 separating central apertures 21 of hub 20 and central aperture 24 of sleeve is formed between the end of hub 20 and the enclosing end of sleeve 22.

Actuating member 11 is comprised of a connecting head 30 having a hollow interior 31 adapted to mate with sleeve 22. A radial channel 32 is formed at the outer edge of hollow interior 31. Channel 32 is adapted to receive a spline collar 33 having interior grooves so as to mate with the spline collar 23 of sleeve 22 thereby rigidly connecting actuating arm 11 to hub 20 of gear housing 12. Spline collar 33 is secured to connecting head 30 of actuating member 11 by means of a plurality fasteners 34.

A central aperture 35 aligned with the central apertures of sleeve 22 and hub 20, is also provided on the connecting head 30 of actuating member 11. Within aperture 35, there is inserted a hollow projecting member 36 having an outer diameter smaller in cross-section than the interior diameter of apertures 24 and 21 of sleeve 22 and hub 20 respectively. Projecting member 36 is secured into connecting head 30 by means of a bushing 37 and stop ring 38. An actuating pin 39 is slidably received within projecting member 36.

Projecting member 36 is provided with at least two ball bearings 40a and 40b adapted to be received, into radial groove 25 formed between sleeve 22 and hub 20. Ballbearings 40a and 40b are released when actuating pin 39 is depressed into projecting member 36 such that ballbearings 40a and 40b can rest within a radial channel 41 formed around actuating pin 39. Actuating pin 39 is kept in the locked position by means of a spring 42 resting between stop ring 43 on pin 39 and internal ridge 44 of projecting member 36.

An actuating disk 47 allows the user to depress actuating pin 39. Actuating disk 47 is slidably inserted within a cavity 45 and retained therein by means of stop ring 46.

As described, the improved coupling assembly of the present invention allows the easy removal and adjustment of an exercising member about a shaft without the need for tools.

I claim:

1. An improved coupling assembly comprising:

a hub shaft having an axial aperture;

a sleeve having a closed end positioned over said hub shaft and mounted thereto for movement with said hub shaft, said sleeve having an axial aperture in said closed end aligned with said axial aperture of said hub shaft, said sleeve being longer than said shaft hub to define an internal radial groove separating said axial apertures;

a member connectable to said hub shaft having a connecting portion comprising a cavity adapted to fit over said sleeve, said cavity containing a centrally located longitudinal projecting member for insertion through said axial apertures of said sleeve and said hub shaft, said projecting member having an axial bore extending therethrough with an actuating member slidable within said axial bore engaging radially extendable locking means in said projecting member to bias said locking means outwardly of the projecting member for engagement in said internal radial groove thereby preventing axial movement between said connectable member and said hub shaft, said actuating means having a narrowed section for selective alignment with said locking means so that said locking means is able to move inwardly of the projecting member out of the internal radial groove thereby releasing said connectable member for axial movement with respect to said hub shaft, said actuating means normally being biased by spring means to a position in which said locking means are engaged in said internal radial groove; and groove and key means between said connectable member and said sleeve to prevent rotation of said connectable member about said sleeve when said locking means are engaged in said internal radial groove.

2. An improved coupling assembly as defined in claim 1 wherein said groove and key means comprises a splined collar about the outer surface of said sleeve member for engagement with a correspondingly splined collar about the internal surface of said cavity of said connectable member when said connectable member is fitted over said sleeve.

3. An improved coupling assembly as defined in claim 1 wherein said locking means comprises a set of ball bearings.

* * * * *